April 22, 1930. R. J. STIFFLEMIRE 1,755,415
SAW FILING STAND
Filed June 17, 1929 2 Sheets-Sheet 1
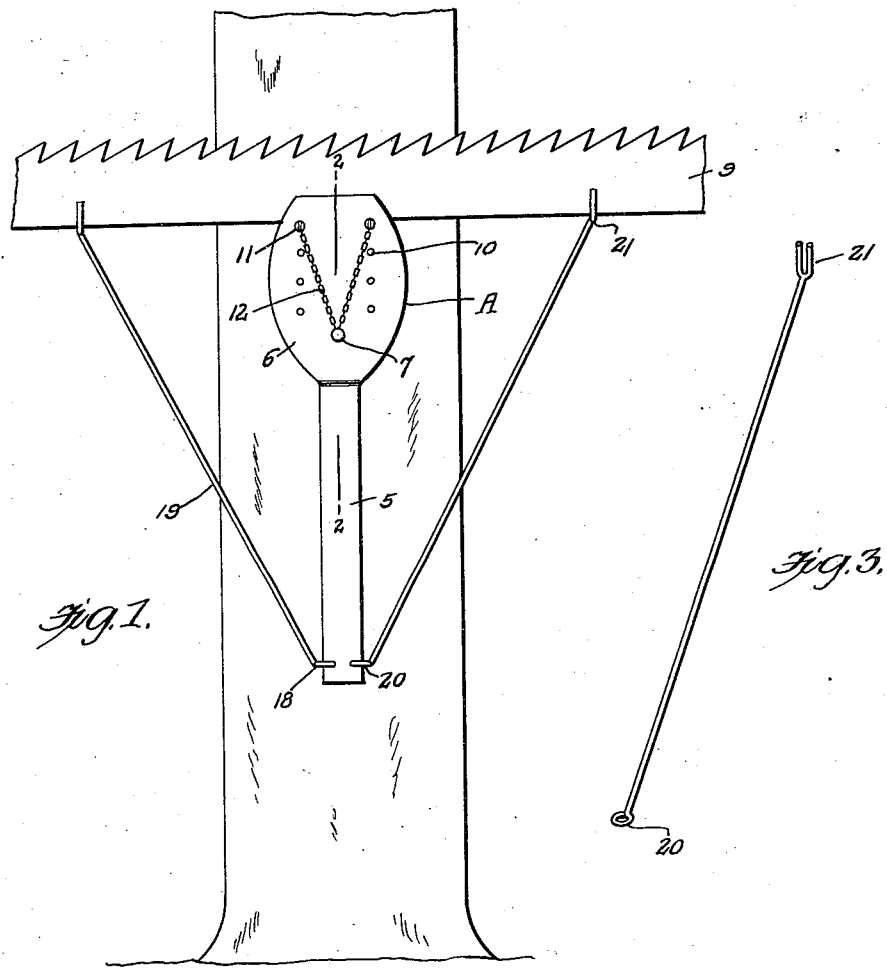
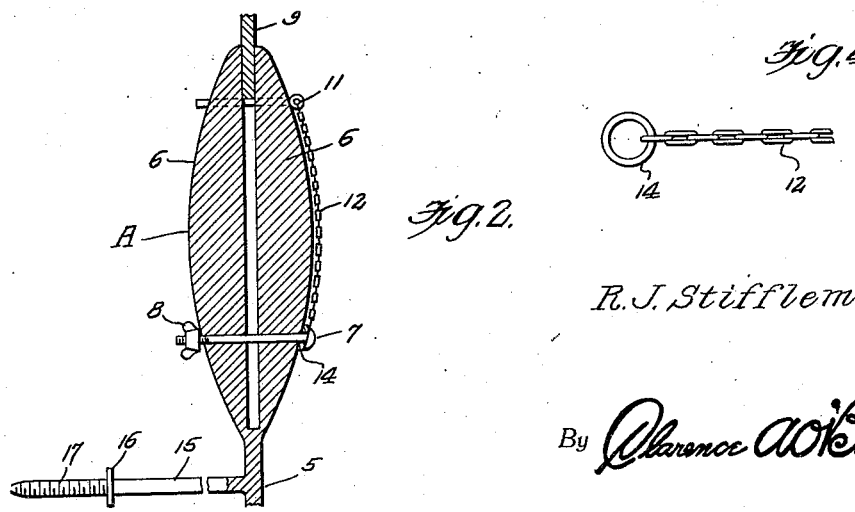
Inventor
R. J. Stifflemire,
By Clarence A. O'Brien
Attorney April 22, 1930.   R. J. STIFFLEMIRE   1,755,415
SAW FILING STAND
Filed June 17, 1929   2 Sheets-Sheet 2
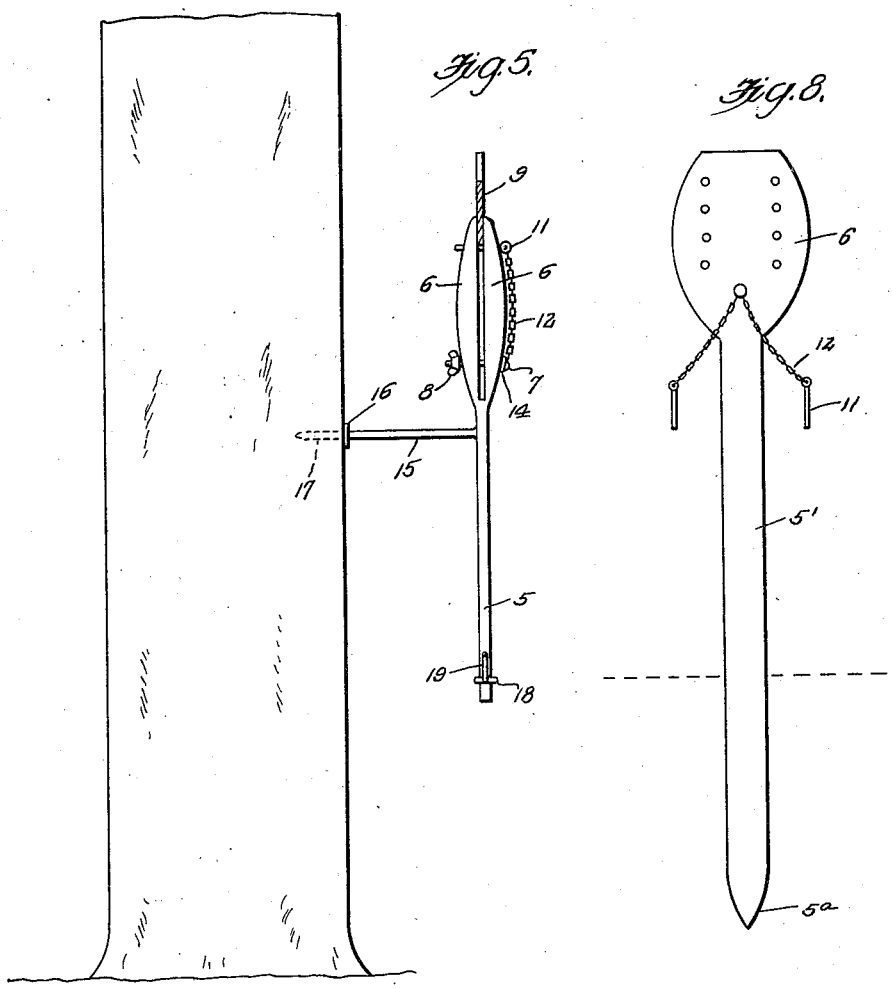
Inventor
R. J. Stifflemire,
By Clarence A. O'Brien
Attorney Patented Apr. 22, 1930

1,755,415

UNITED STATES PATENT OFFICE

ROBERT JAMES STIFFLEMIRE, OF PONCE DE LEON, FLORIDA

SAW-FILING STAND

Application filed June 17, 1929. Serial No. 371,606.

The present invention relates to a saw filing stand particularly well adapted for use in filing cross cut saws and the prime object of the invention resides in the provision of a stand of this nature which may be easily and quickly set up in the forest or wood when it is desired to file the cross cut saw.

Another very important object of the invention resides in the provision of a stand of this nature which will hold the saw steady and firmly while being filed.

Another very important object of the invention resides in the provision of a stand of this nature with means whereby the saw may be held at different elevations as may be desirable.

A still further very important object of the invention resides in the provision of a saw filing stand of this nature which is exceedingly simple in its construction, inexpensive to manufacture, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a front elevation of the saw filing stand embodying the features of my invention;

Figure 2 is a sectional view therethrough taken substantially on the line 2—2 of Figure 1;

Figure 3 is a perspective view of one of the steadying rods;

Figure 4 is a detail view of one of the chains;

Figure 5 is a side elevation of the stand;

Figure 6 is a top plan view thereof;

Figure 7 is a perspective view of one of the pins, and

Figure 8 is a front elevation of another embodiment of the stand.

Referring to the drawing in detail and particularly in the embodiment of the invention disclosed by way of example in Figures 1 to 7 inclusive it will be seen that the numeral 5 denotes an elongated shank having formed on the upper end thereof a head A which is split into two parts forming the jaws 6 through the lower portions of which extends a bolt 7 with a thumb nut 8 thereon so that these jaws may be drawn together and clamp a cross cut saw 9 therebetween.

The jaws are provided with a series of openings 10 for receiving pins 11 on which the saw 9 will rest, it being noted that by placing the pins in different openings the saw may be held in different elevations. These pins are preferably engaged with chains 12 connected together by an eye or ring 14 which is engaged on the bolt 7 thus preventing the pin from becoming lost.

A bolt 15 extends integrally from an intermediate portion of the shank adjacent the head A and is disposed at right angles to the shank having a stop collar 18 adjacent its extremity. The extremity is threaded to form a bit 17 which may be engaged in the trunk of a tree as illustrated in Figures 1 and 5.

The lower side edges of the shank 5 are notched as at 18 and steadying rods 17 have oblique eyes or terminals 20 at their lower ends engaged in said notches 18 while their upper ends have oblique supports 21 for straddling the under edge of the saw thereby steadying the saw during the filing operation.

It will be seen that the stand may be easily set up in the woods or forest so that the cross cut saw may be easily and conveniently filed.

In Figure 8, I have shown a slightly modified form of the invention wherein shank 5' is longer than the shank 5 and terminates in a point 5ᵃ so that the shank may be driven into the ground. Otherwise this embodiment of the invention is identical with that just described.

This device provides a steady stand which may be raised or lowered with ease to suit the filer's taste, and it also holds the saw between the jaws firmly by use of the thumb nut and bolt so as to eliminate any tendency of the saw to rock to and fro, as the filer draws the file across the saw tooth.

It is thought that the construction, utility and advantages of the invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A stand of the class described, comprising a shank with a head formed integrally on one end thereof and split to provide a pair of jaws for receiving a saw therebetween, means for drawing the jaws together to clamp them in engagement with the saw, said jaws having a plurality of openings, and pins insertable through said openings to support the saw at the desired elevation, chains connected to said pins and anchored on one of the jaws, said shank having notches in its side edges, rods having offset terminals engageable in said notches and fork terminals to engage the under edge of the saw.

2. A stand of the class described, comprising a shank with a head formed integrally on one end thereof and split to provide a pair of jaws for receiving a saw therebetween, means for drawing the jaws together to clamp them in engagement with the saw, said jaws having a plurality of openings, and pins insertable through said openings to support the saw at the desired elevation, chains connected to said pins and anchored on one of the jaws, said shank having notches in its side edges, rods having offset terminals engageable in said notches and fork terminals to engage the under edge of the saw, a bolt extending laterally from the shank and having a threaded terminal.

3. A stand of class class described, comprising a shank with a head formed integrally on one end thereof and split to provide a pair of jaws for receiving a saw therebetween, means for drawing the jaws together to clamp them in engagement with the saw, said jaws having a plurality of openings, and pins insertable through said openings to support the saw at the desired elevation, chains connected to said pins and anchored on one of the jaws, said shank having notches in its side edges, rods having offset terminals engageable in said notches and fork terminals to engage the under edge of the saw, a bolt extending laterally from the shank and having a threaded terminal, a stop collar adjacent the terminal.

4. A stand of the class described, comprising a shank with a head formed integrally on one end thereof, and split to provide a pair of jaws for receiving a saw therebetween, means for drawing the jaws together to clamp them in engagement with the saw, means for adjustably supporting the saw between the jaws at a predetermined elevation, rods extending in divergent relation from the lower end of said shank, the upper ends of said rods terminating in forks to engage the under edge of the saw.

5. A stand of the class described, comprising a shank with a head formed integrally on one end thereof, and split to provide a pair of jaws for receiving a saw therebetween, means for drawing the jaws together to clamp them in engagement with the saw, means for adjustably supporting the saw between the jaws at a predetermined elevation, rods extending in divergent relation from the lower end of said shank, the upper ends of said rods terminating in forks to engage the under edge of the saw, a support penetrating member extending laterally from the shank, and a stop collar formed on said penetrating member intermediate the ends of the latter.

In testimony whereof I affix my signature.

ROBERT JAMES STIFFLEMIRE.